United States Patent
Yang

(10) Patent No.: US 11,767,033 B2
(45) Date of Patent: Sep. 26, 2023

(54) SYSTEM AND METHOD FOR AVOIDING COLLISION BASED ON VISION

(71) Applicant: HYUNDAI MOBIS CO., LTD., Seoul (KR)

(72) Inventor: Jin Ho Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 215 days.

(21) Appl. No.: 17/405,316

(22) Filed: Aug. 18, 2021

(65) Prior Publication Data
US 2022/0055658 A1    Feb. 24, 2022

(30) Foreign Application Priority Data

Aug. 18, 2020   (KR) .......................... 10-2020-0103413

(51) Int. Cl.
| | | |
|---|---|---|
| *B60W 60/00* | (2020.01) | |
| *G06V 20/58* | (2022.01) | |
| *B60W 30/09* | (2012.01) | |
| *B60W 40/04* | (2006.01) | |

(52) U.S. Cl.
CPC ........ *B60W 60/0011* (2020.02); *B60W 30/09* (2013.01); *B60W 40/04* (2013.01); *G06V 20/58* (2022.01)

(58) Field of Classification Search
CPC ... B60W 60/0011; B60W 30/09; B60W 40/04
See application file for complete search history.

(56) References Cited

U.S. PATENT DOCUMENTS

| | | | | |
|---|---|---|---|---|
| 10,703,361 | B2 * | 7/2020 | Prokhorov | ........ B60W 60/0059 |
| 10,733,892 | B2 * | 8/2020 | Pflug | ...................... G08G 1/163 |
| 2007/0211144 | A1 | 9/2007 | Fujita et al. | |
| 2018/0362028 | A1 | 12/2018 | Prokhorov | |
| 2019/0066508 | A1 | 2/2019 | Pflug | |

FOREIGN PATENT DOCUMENTS

| | | |
|---|---|---|
| CN | 109891349 A | 6/2019 |
| CN | 110834630 A | 2/2020 |
| KR | 10-1488636 B | 2/2015 |
| WO | 2005/093657 A1 | 10/2005 |

OTHER PUBLICATIONS

Extended European Search Report issued in corresponding European Patent Application No. 21190024.6 dated Jan. 17, 2022.
Office Action dated Jun. 14, 2013 for counterpart Chinese Patent Application No. 202110951620.3 (See English Translation).

* cited by examiner

*Primary Examiner* — Tarek Elarabi
(74) *Attorney, Agent, or Firm* — Morgan, Lewis & Bockius LLP

(57) ABSTRACT

A system for avoiding a collision based on a vision includes a camera for filming a region ahead of a vehicle, a path generating device that sets a travelable region where the vehicle may travel by avoiding an obstacle in a vision of the region ahead of the vehicle filmed by the camera, and generates one or more travel paths in the travelable region, and a motion controller that selects one optimal path from the travel paths to perform a longitudinal control or a lateral control of the vehicle such that the vehicle travels along the optimal path.

10 Claims, 5 Drawing Sheets

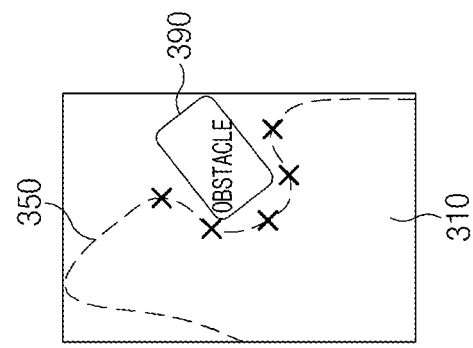
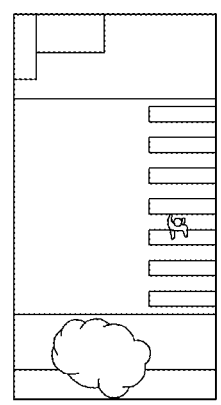
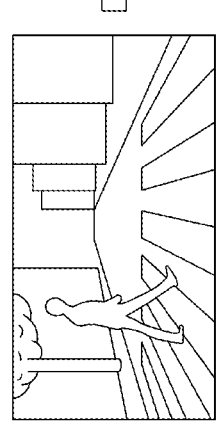
FIG. 2A
FIG. 2B
FIG. 2C

SYSTEM AND METHOD FOR AVOIDING COLLISION BASED ON VISION

CROSS-REFERENCE TO RELATED APPLICATION

This application claims the benefit of priority to Korean Patent Application No. 10-2020-0103413, filed in the Korean Intellectual Property Office on Aug. 18, 2020, the entire contents of which are incorporated herein by reference.

TECHNICAL FIELD

The present disclosure relates to vision-based collision avoidance system and method, and more particularly, to vision-based collision avoidance system and method that use semantic segmentation, which is a deep learning vision recognition technology, to separate an obstacle, a travelable region, and a non-travelable region from each other in a travel vision of a region ahead of a vehicle, and transform coordinates thereof to generate an optimal avoidance path.

BACKGROUND

In general, existing advanced driver assistance systems (ADAS) technologies for preventing a pedestrian collision have been developed based on a distance sensor and a vision sensor in an automobile market.

The distance sensor typically includes an active sensor such as a radar, a lidar, and the like. The distance sensor has recognized an avoidance target using such active sensor, and has generated a local path through path planning algorithm.

However, raw data of the sensor for collision avoidance is usually very noisy, and it was difficult to determine a travelable region of a vehicle from the raw data of the sensor even through post processing, sensor fusion, and the like.

In addition, the radar sensor may acquire information such as a relative distance and a relative speed with respect to a recognized target relatively accurately, but may not be able to provide information to understand a current state of the pedestrian in detail for the collision avoidance, so that there is a difficulty in recognizing the pedestrian.

The lidar sensor may accurately understand a surrounding environment by constructing information on the surrounding environment in three dimensions. However, the lidar sensor must be installed on an exterior of the vehicle to ensure precision, requires large data capacity, and has a relatively high unit price, so that the lidar sensor is skeptical from a point of view of mass production.

On the other hand, a camera sensor provides sufficient information to analyze the pedestrian. In particular, a monocular camera is inexpensive, so that it is less burdensome from a point of view of commercialization. With these advantages, research on a computer vision technology using the camera sensor is being actively conducted.

SUMMARY

The present disclosure has been made to solve the above-mentioned problems occurring in the prior art while advantages achieved by the prior art are maintained intact.

An aspect of the present disclosure provides vision-based collision avoidance system and method that use semantic segmentation, which is a deep learning vision recognition technology, to separate an obstacle, a travelable region, and a non-travelable region from each other in a travel vision of a region ahead of a vehicle, and transform coordinates thereof to generate an optimal avoidance path, so that a production cost may be reduced because an active sensor applied to an existing collision avoidance system is not used as the optimal avoidance path is determined through a vision device, and an error such as a false-positive (FP) ghost target that is sensed because of a characteristic of a radar sensor although it does not exist in reality may be fundamentally prevented, thereby providing stability for collision avoidance.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for avoiding a collision based on a vision includes a camera for filming a region ahead of a vehicle, a path generating device that sets a travelable region where the vehicle may travel by avoiding an obstacle in a vision of the region ahead of the vehicle filmed by the camera, and generates one or more travel paths in the travelable region, and a motion controller that selects one optimal path from the one or more travel paths to perform a longitudinal control or a lateral control of the vehicle such that the vehicle travels along the optimal path.

In one implementation, the path generating device may convert the vision of the region ahead of the vehicle into a top view vision, and to form a limit line by connecting points spaced apart from each other at a preset spacing and spaced from an outermost line of the obstacle in a direction away from the outermost line in the top view vision.

In one implementation, the path generating device may define, as the travelable region, a region defined inside the limit line in the direction away from the outermost line.

In one implementation, the path generating device may form a vanishing point in the top view vision at an intersection of a first diagonal line connecting a top right corner and a bottom left corner to each other and a second diagonal line connecting a top left corner and a bottom right corner to each other, form a plurality of horizontal division lines by dividing a vertical dimension from the vanishing point to a bottom into a preset number of equal dimensions, form intersections of the plurality of horizontal division lines, the first diagonal line, and the second diagonal line, form a plurality of candidate points on each horizontal division line between an intersection of the horizontal division line with the first diagonal line and an intersection of the horizontal division line with the second diagonal line, and generate the optimal path by selecting one of the plurality of candidate points formed on each horizontal division line.

In one implementation, the path generating device may generate the optimal path by selecting one of candidate points located in the travelable region among the candidate points formed on each horizontal division line.

In one implementation, the optimal path may satisfy a Clothoid constraint condition.

In one implementation, the motion controller may perform the longitudinal control or the lateral control of the vehicle such that the vehicle travels along the optimal path formed on each horizontal division line.

According to another aspect of the present disclosure, A method for avoiding a collision based on a vision includes a filming operation of receiving, by a path generating device, a vision of a region ahead of a vehicle filmed by a camera, a selection operation of setting, by the path generating device, a travelable region where the vehicle may travel by avoiding an obstacle in the vision of the region ahead of the vehicle, generating one or more travel paths in the travelable region, and selecting one optimal path from the one or more travel paths, and a path operation of performing, by a motion controller, a longitudinal control or a lateral control of the vehicle such that the vehicle travels along the optimal path.

In one implementation, the selection operation may include converting the vision of the region ahead of the vehicle into a top view vision, and forming a limit line by connecting points spaced apart from each other at a preset spacing and spaced from an outermost line of the obstacle in a direction away from the outermost line in the top view vision.

In one implementation, the selection operation may include defining, as the travelable region, a region defined inside the limit line in the direction away from the outermost line.

In one implementation, the selection operation may include forming a vanishing point at an intersection of a first diagonal line connecting a top right corner and a bottom left corner to each other and a second diagonal line connecting a top left corner and a bottom right corner to each other in the top view vision, forming a plurality of horizontal division lines by dividing a vertical dimension from the vanishing point to a bottom into a preset number of equal dimensions, forming intersections of the plurality of horizontal division lines, the first diagonal line, and the second diagonal line, forming a plurality of candidate points on each horizontal division line between an intersection of the horizontal division line with the first diagonal line and an intersection of the horizontal division line with the second diagonal line, and generating the optimal path by selecting one of the plurality of candidate points formed on each horizontal division line.

In one implementation, the selection operation may include generating the optimal path by selecting one of candidate points located in the travelable region among the candidate points formed on each horizontal division line.

In one implementation, the selection operation may include forming the optimal path to satisfy a Clothoid constraint condition.

In one implementation, the path operation may include performing the longitudinal control or the lateral control of the vehicle such that the vehicle travels along the optimal path formed on each horizontal division line.

BRIEF DESCRIPTION OF THE DRAWINGS

The above and other objects, features and advantages of the present disclosure will be more apparent from the following detailed description taken in conjunction with the accompanying drawings:

FIGS. 2A, 2B, and 2C are diagrams for illustrating a travelable region in a vision-based collision avoidance system according to an embodiment of the present disclosure;

DETAILED DESCRIPTION

Figure 1:
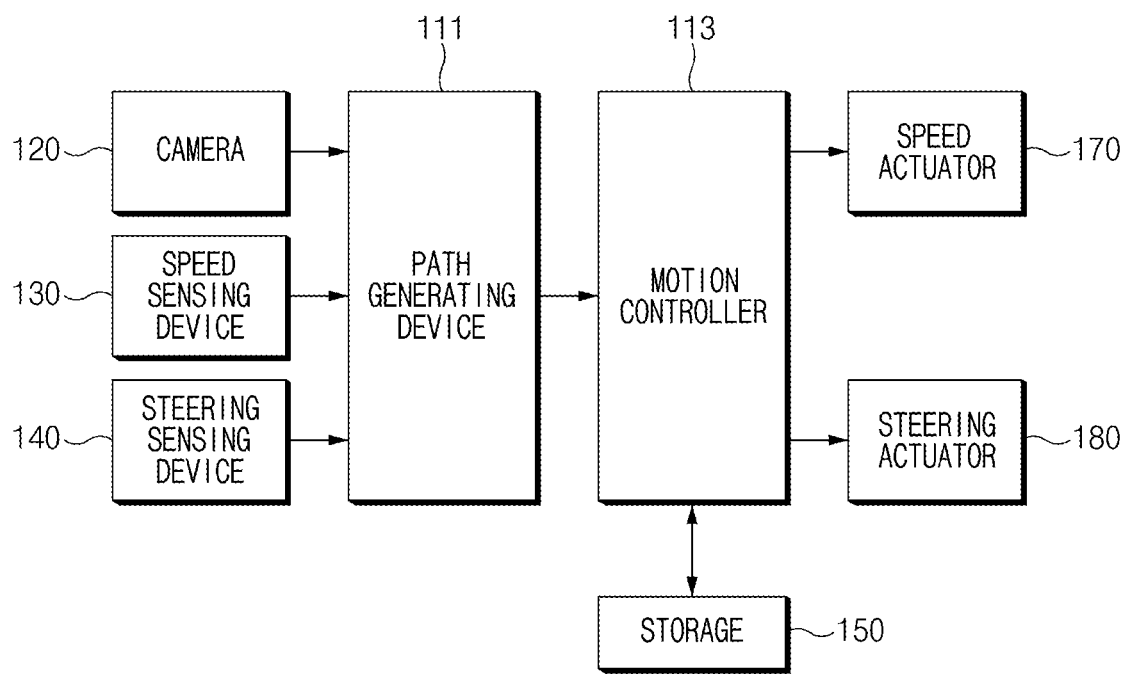
FIG. 1 is a block diagram showing a vision-based collision avoidance system according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 4.

Figure 3:
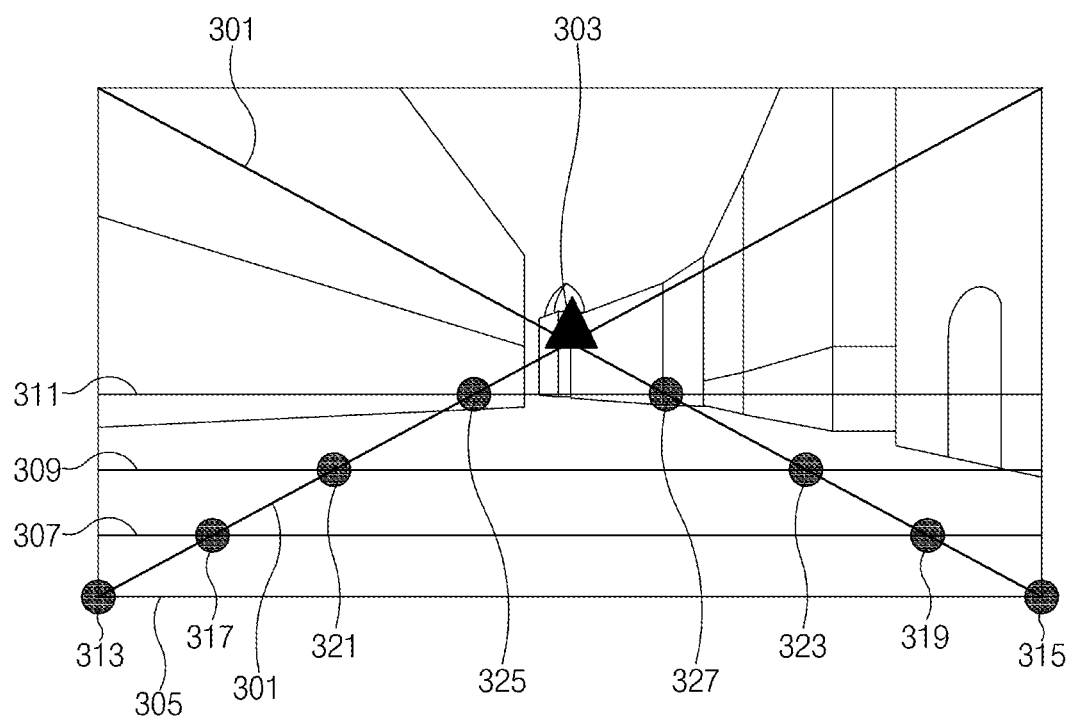
FIGS. 3 and 4 are diagrams for illustrating an optimal path calculation process in a vision-based collision avoidance system according to an embodiment of the present disclosure.
Figure 4:
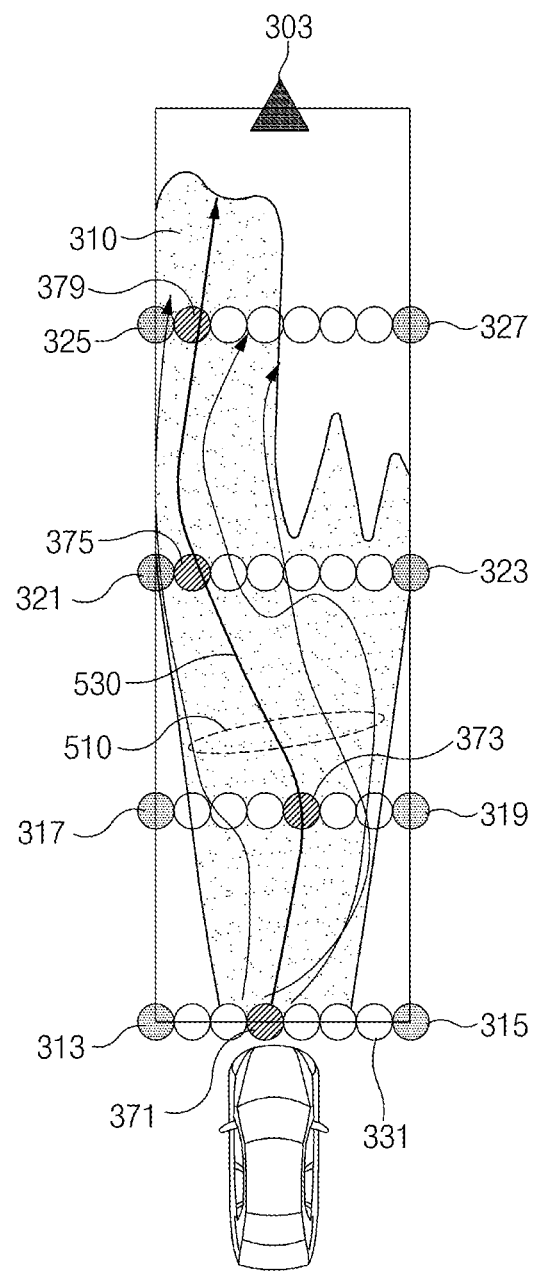

FIG. 1 is a block diagram showing a vision-based collision avoidance system according to an embodiment of the present disclosure, FIGS. 2A, 2B, and 2C are diagrams for illustrating a travelable region in a vision-based collision avoidance system according to an embodiment of the present disclosure, and FIGS. 3 and 4 are diagrams for illustrating an optimal path calculation process in a vision-based collision avoidance system according to an embodiment of the present disclosure.

Referring to FIG. 1, a vision-based collision avoidance system according to an embodiment of the present disclosure may include a path generating device 111, a motion controller 113, a camera 120, a speed sensing device 130, a steering sensing device 140, a speed actuator 170, and a steering actuator 180.

The vision-based collision avoidance system according to an exemplary embodiment of the present disclosure may include a processor (e.g., computer, microprocessor, CPU, ASIC, circuitry, logic circuits, etc.) having an associated non-transitory memory storing software instructions which, when executed by the processor, provides the functionalities of the path generating device 111.

The motion controller 113 of the vision-based collision avoidance system according to an exemplary embodiment of the present disclosure may be a processor (e.g., computer, microprocessor, CPU, ASIC, circuitry, logic circuits, etc.). The motion controller 113 may be implemented by a non-transitory memory storing, e.g., a program(s), software instructions reproducing algorithms, etc., which, when executed, controls operations of various components of a vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The camera 120, which is able to be installed at a front portion of a vehicle, may film a region ahead of the vehicle, collect image or vision information of the region ahead of the vehicle, and provide the image or vision information to the path generating device 111. A low-cost dash cam or the like may also be used as long as it is able to film the region ahead of the vehicle.

The speed sensing device 130, which is able to sense a travel speed of the vehicle, may sense the travel speed using a speed at which a wheel of the vehicle rotates.

The steering sensing device 140 may detect a steering angle that is a turning angle of a steering wheel during travel of the vehicle.

The speed actuator 170, which is able to adjust the speed of the vehicle, may include an accelerator driver that receives a control signal from the motion controller 113 and drives an accelerator to increase the speed of the vehicle, and a brake driver that receives the control signal from the motion controller 113 and drives a brake to reduce the speed of the vehicle.

The steering actuator 180, which is able to adjust a traveling direction of the vehicle, may receive the control signal from the motion controller 113 and drive the steering wheel to change the traveling direction of the vehicle.

In addition, storage 150 that may store various data related to control of the vehicle may be further included. The storage 150 may store information on the travel speed, a travel distance, and a travel time of the vehicle, and may store location information of an obstacle sensed by the camera 120.

Referring to FIGS. 2A to 2C, the path generating device 111 may receive the vision (FIG. 2A) of the region ahead of the vehicle filmed through the camera 120, and convert the vision (FIG. 2A) into a top view vision (bird-eye view) (FIG. 2B) using perspective transformation or the like, which is a known technology, and separate an obstacle 390, a travelable region 310 in which the vehicle may travel by avoiding the obstacle 390, and a non-travelable region in which the vehicle is not able to travel because of the obstacle from each other with a limit line 350 (FIG. 2C) using a network learnt semantic segmentation, which is a deep learning vision recognition technology.

Subsequently, one or more travel paths may be generated in the travelable region 310 and one optimal path may be selected from the travel paths to perform longitudinal or lateral control of the vehicle such that the vehicle travels along the optimal path.

In this connection, the limit line 350 is formed by connecting points spaced apart from each other at a preset spacing and spaced from an outermost line of the obstacle 390 toward the inward travelable region, in a direction away from the outermost line, with a line. The preset spacing may be about a width length of the vehicle.

Therefore, even when the vehicle travels near the obstacle 390, because there is the spacing with the width length of the vehicle, collision with the obstacle may be prevented.

Hereinafter, the optimal path generation of the vehicle will be described in detail. Referring to FIG. 3, the path generating device 111 may form a first diagonal line 301 that connects a top right corner and a bottom left corner with each other and a second diagonal line 302 that connects a top left corner and a bottom right corner with each other in the top view vision, and may form a vanishing point 303 at an intersection of the first diagonal line 301 and the second diagonal line 302.

Subsequently, it is possible to form an intersection of the first diagonal line 301 and the second diagonal line 302 and horizontal division lines generated by dividing a vertical dimension from the vanishing point 303 to a bottom of the top view vision into N equal dimensions.

The number N of equally divided dimensions of the vertical dimension from the vanishing point 303 to the bottom of the top view vision may be calibrated differently based on intrinsic parameters (a camera focal length, a principal point position, an image sensor pixel size, and the like) of the camera 120 or a mounting position of the camera 120.

For example, when the vertical dimension from the vanishing point 303 to the bottom of the top view vision is divided into 4 equal dimensions, a second horizontal division line 307, a third horizontal division line 309, and a fourth horizontal division line 311 may be sequentially formed while being spaced upwardly apart from a first horizontal division line 305, which is the bottom of the top view vision.

Subsequently, a first intersection 313, which is an intersection of the first horizontal division line 305 and the first diagonal line 301, may be formed, and a second intersection 315, which is an intersection of the first horizontal division line 305 and the second diagonal line 302, may be formed.

As such, a third intersection 317, which is an intersection of the second horizontal division line 307 and the first diagonal line 301, may be formed, a fourth intersection 319, which is an intersection of the second horizontal division line 307 and the second diagonal line 302, may be formed, a fifth intersection 321, which is an intersection of the third horizontal division line 309 and the first diagonal line 301, may be formed, a sixth intersection 323, which is an intersection of the third horizontal division line 309 and the second diagonal line 302, may be formed, a seventh intersection 325, which is an intersection of the fourth horizontal division line 311 and the first diagonal line 301, may be formed, and an eighth intersection 327, which is an intersection of the fourth horizontal division line 311 and the second diagonal line 302, may be formed.

Subsequently, referring to FIG. 4, a plurality of candidate points 331 may be formed between the first intersection 313 and the second intersection 315 of the first horizontal division line 305, the plurality of candidate points 331 may be formed between the third intersection 317 and the fourth intersection 319 of the second horizontal division line 307, the plurality of candidate points 331 may be formed between the fifth intersection 321 and the sixth intersection 323 of the third horizontal division line 309, and the plurality of candidate points 331 may be formed between the seventh intersection 325 and the eighth intersection 327 of the fourth horizontal division line 311.

A spacing between the candidate points 331 may be about the width length of the vehicle.

Subsequently, in the travelable region 310 in which the obstacle 390 does not exist, a plurality of travel paths 510 may be formed by connecting one candidate point 331 of the second horizontal division line 307 to one candidate point 331 of the first horizontal division line 305, connecting one candidate point 331 of the third horizontal division line 309 to one candidate point 331 of the second horizontal division line 307, and connecting one candidate point 331 of the fourth horizontal division line 311 to one candidate point 331 of the third horizontal division line 309.

In one example, the travel path 510 may extend in a longitudinal direction while having a curved shape that is curved in a transverse direction, so that one of the plurality of travel paths 510 may be selected to generate an optimal path 530, and the optimal path 530 may satisfy a Clothoid constraint condition.

Therefore, the candidate point 331 of the first horizontal division line 305, which is a starting point of the optimal path 530, may be formed as a first path point 371, the candidate point 331 of the second horizontal division line 307 through which the optimal path 530 passes may be formed as a second path point 373, the candidate point 331 of the third horizontal division line 309 through which the optimal path 530 passes may be formed as a third path point 375, and the candidate point 331 of the fourth horizontal division line 311 through which the optimal path 530 passes may be formed as a fourth path point 379.

That is, among the plurality of travel paths 510, a travel path that connects the first path point 371, the second path point 373, the third path point 375, and the fourth path point 379 with each other while satisfying the Clothoid constraint condition may be selected as the optimal path 530.

Subsequently, the motion controller 113 may control driving of the speed actuator 170 and the steering actuator 180 to allow the vehicle to travel in the travelable region 310 along the optimal path 530 while performing the longitudinal control or the lateral control along the selected optimal path 530.

In one example, the motion controller 113 may allow the vehicle to travel while performing the longitudinal control when there is no optimal path.

Figure 5:
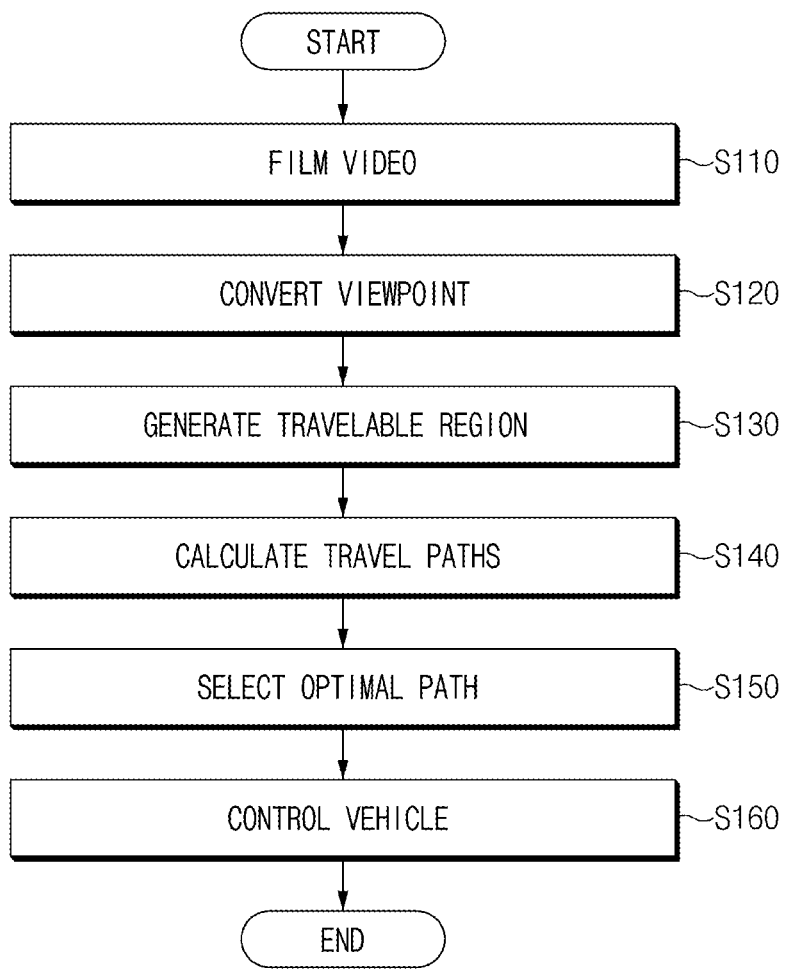
FIG. 5 is a flowchart for illustrating a vision-based collision avoidance method according to an embodiment of the present disclosure.

Hereinafter, a vision-based collision avoidance method according to another embodiment of the present disclosure will be described in detail with reference to FIG. 5. FIG. 5 is a flowchart for illustrating a vision-based collision avoidance method according to an embodiment of the present disclosure.

Hereinafter, it is assumed that the vision-based collision avoidance system in FIG. 1 performs a process in FIG. 5.

First, the path generating device 111 may receive the vision of the region ahead of the vehicle filmed through the camera 120 (S110).

Subsequently, the path generating device 111 may convert the vision of the region ahead of the vehicle to the top view vision (S120), and form the limit line 350 by connecting the points spaced apart from each other at the preset spacing and spaced from the outermost line of the obstacle 390 toward the inward travelable region 310, in a direction away from the outermost line, with the line in the top view vision (S130).

Subsequently, one or more travel paths may be generated in the travelable region (S140), and the vanishing point may be formed at the intersection of the first diagonal line that connects the top right corner and the bottom left corner with each other and the second diagonal line that connects the top left corner and the bottom right corner with each other in the top view vision.

Subsequently, the plurality of horizontal division lines may be formed by dividing the vertical dimension from the vanishing point to the bottom into a preset number of equal dimensions, the intersections of the plurality of horizontal division lines, the first diagonal line, and the second diagonal line may be formed, and the plurality of candidate points may be formed on each horizontal division line between an intersection of the horizontal division line with the first diagonal line and an intersection of the horizontal division line with the second diagonal line.

Subsequently, the optimal path may be generated by selecting one of candidate points located in the travelable region among candidate points formed on each horizontal division line, and the optimal path may satisfy the Clothoid constraint condition (S150).

Subsequently, the longitudinal control or the lateral control of the vehicle may be performed through the motion controller 113 such that the vehicle travels along the optimal path (S160).

According to the vision-based collision avoidance system and method of the present disclosure as described above, the present technology may use the semantic segmentation, which is the deep learning vision recognition technology, to separate the obstacle, the travelable region, and the non-travelable region from each other in the travel vision of the region ahead of the vehicle, and transform the coordinates thereof to generate the optimal avoidance path, so that the production cost may be reduced because the active sensor applied to the existing collision avoidance system is not used as the optimal avoidance path is determined through the vision device, and the error such as the false-positive (FP) ghost target that is sensed because of the characteristic of the radar sensor although it does not exist in reality may be fundamentally prevented, thereby providing the stability for the collision avoidance.

In one example, the vision-based collision avoidance method based on operations S110 to S160 according to the present disclosure may be programmed and stored in a computer-readable recording medium.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The present technology may use the semantic segmentation, which is the deep learning vision recognition technology, to separate the obstacle, the travelable region, and the non-travelable region from each other in the travel vision of the region ahead of the vehicle, and transform the coordinates thereof to generate the optimal avoidance path, so that the production cost may be reduced because the active sensor applied to the existing collision avoidance system is not used as the optimal avoidance path is determined through the vision device, and the error such as the false-positive (FP) ghost target that is sensed because of the characteristic of the radar sensor although it does not exist in reality may be fundamentally prevented, thereby providing the stability for the collision avoidance.

In addition, various effects directly or indirectly identified through this document may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A system for avoiding a collision based on a vision, the system comprising:

a camera for filming a region ahead of a vehicle;
a path generating device is configured to:
  set a travelable region where the vehicle may travel by avoiding an obstacle in a vision of the region ahead of the vehicle filmed by the camera; and
  generate one or more travel paths in the travelable region; and
a motion controller configured to select one optimal path from the one or more travel paths to perform a longitudinal control or a lateral control of the vehicle such that the vehicle travels along the optimal path, wherein the path generating device is further configured to:
convert the vision of the region ahead of the vehicle into a top view vision;
form a limit line by connecting points spaced apart from each other at a preset spacing and spaced from an outermost line of the obstacle in a direction away from the outermost line in the top view vision;
form a vanishing point in the top view vision at an intersection of a first diagonal line connecting a top right corner and a bottom left corner to each other and a second diagonal line connecting a top left corner and a bottom right corner to each other;
form a plurality of horizontal division lines that divide a vertical dimension from the vanishing point to a bottom into a preset number of equal dimensions;
form intersections of the plurality of horizontal division lines, the first diagonal line, and the second diagonal line;
form a plurality of candidate points on each horizontal division line between an intersection of the horizontal division line with the first diagonal line and an intersection of the horizontal division line with the second diagonal line; and
generate the optimal path by selecting one of the plurality of candidate points formed on each horizontal division line.

2. The system of claim 1, wherein the path generating device is further configured to define, as the travelable region, a region defined inside the limit line in the direction away from the outermost line.

3. The system of claim 1, wherein the path generating device is further configured to generate the optimal path by selecting one of candidate points located in the travelable region among the plurality of candidate points formed on each horizontal division line.

4. The system of claim 1, wherein the optimal path satisfies a Clothoid constraint condition.

5. The system of claim 1, wherein the motion controller is further configured to perform the longitudinal control or the lateral control of the vehicle such that the vehicle travels along the optimal path formed on each horizontal division line.

6. A method for avoiding a collision based on a vision, the method comprising:
  a filming operation of receiving, by a path generating device, a vision of a region ahead of a vehicle filmed by a camera;
  a selection operation of setting, by the path generating device, a travelable region where the vehicle may travel by avoiding an obstacle in the vision of the region ahead of the vehicle, generating one or more travel paths in the travelable region, and selecting one optimal path from the one or more travel paths; and
  a path operation of performing, by a motion controller, a longitudinal control or a lateral control of the vehicle such that the vehicle travels along the optimal path, wherein the selection operation includes:
  converting the vision of the region ahead of the vehicle into a top view vision;
  forming a limit line by connecting points spaced apart from each other at a preset spacing and spaced from an outermost line of the obstacle in a direction away from the outermost line in the top view vision;
  forming a vanishing point in the top view vision at an intersection of a first diagonal line connecting a top right corner and a bottom left corner to each other and a second diagonal line connecting a top left corner and a bottom right corner to each other;
  forming a plurality of horizontal division lines that divide a vertical dimension from the vanishing point to a bottom into a preset number of equal dimensions;
  forming intersections of the plurality of horizontal division lines, the first diagonal line, and the second diagonal line;
  forming a plurality of candidate points on each horizontal division line between an intersection of the horizontal division line with the first diagonal line and an intersection of the horizontal division line with the second diagonal line; and
  generating the optimal path by selecting one of the plurality of candidate points formed on each horizontal division line.

7. The method of claim 6, wherein the selection operation includes:
  defining, as the travelable region, a region defined inside the limit line in the direction away from the outermost line.

8. The method of claim 6, wherein the selection operation includes:
  generating the optimal path by selecting one of candidate points located in the travelable region among the plurality of candidate points formed on each horizontal division line.

9. The system of claim 6, wherein the selection operation includes:
  forming the optimal path to satisfy a Clothoid constraint condition.

10. The system of claim 6, wherein the path operation includes:
  performing the longitudinal control or the lateral control of the vehicle such that the vehicle travels along the optimal path formed on each horizontal division line.

* * * * *